United States Patent
Mihály et al.

(10) Patent No.: US 11,856,547 B2
(45) Date of Patent: Dec. 26, 2023

(54) METHOD OF REGISTERING A SERVICE IN A TELECOMMUNICATION NETWORK HAVING A SERVICE BASED ARCHITECTURE, SBA, AS WELL AS A CORRESPONDING COLLECTION CONTROLLER

(71) Applicant: Telefonaktiebolaget LM Ericsson (publ), Stockholm (SE)

(72) Inventors: Attila Mihály, Dunakeszi (HU); Maria Cruz Bartolome Rodrigo, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 212 days.

(21) Appl. No.: 17/430,156

(22) PCT Filed: Mar. 26, 2019

(86) PCT No.: PCT/EP2019/057516
§ 371 (c)(1),
(2) Date: Aug. 11, 2021

(87) PCT Pub. No.: WO2020/164749
PCT Pub. Date: Aug. 20, 2020

(65) Prior Publication Data
US 2022/0104161 A1    Mar. 31, 2022

(30) Foreign Application Priority Data
Feb. 15, 2019    (EP) .................................... 19382107

(51) Int. Cl.
*H04W 60/00*    (2009.01)
*H04W 48/06*    (2009.01)
(Continued)

(52) U.S. Cl.
CPC ............. *H04W 60/00* (2013.01); *H04L 67/51* (2022.05); *H04W 48/16* (2013.01)

(58) Field of Classification Search
CPC .............................. H04L 67/51; H04W 48/16
(Continued)

(56) References Cited

U.S. PATENT DOCUMENTS

| | | | |
|---|---|---|---|
| 2008/0162637 A1* | 7/2008 | Adamczyk | H04L 51/043 709/204 |
| 2018/0376384 A1* | 12/2018 | Youn | H04W 36/0022 |
| 2020/0413241 A1* | 12/2020 | Park | H04W 76/22 |

OTHER PUBLICATIONS

International Search Report and Written Opinion dated Oct. 10, 2019 for International Application No. PCT/EP2019/057516 filed Mar. 26, 2019, consisting of 9-pages.
(Continued)

*Primary Examiner* — Fabricio R Murillo Garcia
(74) *Attorney, Agent, or Firm* — Christopher & Weisberg, P.A.

(57) ABSTRACT

A method of registering a service in a telecommunication network having a Service Based Architecture, SBA. The telecommunication network has a Service Collection Function, SCF, including a plurality of distinct SBA services and including a Collection Controller, CoC, for registering and discovering the plurality of distinct SBA services within the SCF. The telecommunication network further includes a Network Repository Function, NRF, for registering and discovering services within the telecommunication network. The method includes the steps of receiving, by the CoC, from an of the distinct SBA services, a registration message for registering a service, determining, by the CoC, that the service is to be provided within the SCF, refraining, by the CoC, from forwarding the registration message to said NRF based on the determination, registering, by the CoC, the
(Continued)

service in the CoC for discovering the service by any of the plurality of distinct SBA services within the SCF.

20 Claims, 6 Drawing Sheets

(51) Int. Cl.
    *H04L 67/51*     (2022.01)
    *H04W 48/16*     (2009.01)

(58) Field of Classification Search
    USPC .................................................... 455/435.1
    See application file for complete search history.

(56) References Cited

OTHER PUBLICATIONS

International Preliminary Report on Patentability dated May 10, 2021 for International Application No. PCT/EP2019/057516 filed Mar. 26, 2019, consisting of 20-pages.

3GPP TR 23.742 V2.0.0; 3rd Generation Partnership Project; Technical Specification Group Services and System Aspects; Study on Enhancements to the Service-Based Architecture (Release 16). Dec. 2018, consisting of 132-pages.

3GPP TR 23.501 V15.3.0; 3rd Generation Partnership Project; Technical Specification Group Services and System Aspects; System Architecture for the 5G System; Stage 2 (Release 15). Sep. 2018, consisting of 226-pages.

ETSI TS 123.502 V15.3.0; 5G; Procedures for the 5G System (3GPP TS 23.502 version 15.3.0 Release 15), Sep. 2018, consisting of 329-pages.

\* cited by examiner

METHOD OF REGISTERING A SERVICE IN A TELECOMMUNICATION NETWORK HAVING A SERVICE BASED ARCHITECTURE, SBA, AS WELL AS A CORRESPONDING COLLECTION CONTROLLER

CROSS-REFERENCE TO RELATED APPLICATIONS

This application is a Submission Under 35 U.S.C. § 371 for U.S. National Stage Patent Application of International Application No.: PCT/EP2019/057516, filed Mar. 26, 2019 entitled "A METHOD OF REGISTERING A SERVICE IN A TELECOMMUNICATION NETWORK HAVING A SERVICE BASED ARCHITECTURE, SBA, AS WELL AS A CORRESPONDING COLLECTION CONTROLLER," which claims priority to European Application No.: 19382107.1, filed Feb. 15, 2019, the entireties of both of which are incorporated herein by reference.

TECHNICAL FIELD

The present application relates generally to the registration of a service in a telecommunication network and, more specifically, to service collections in Service Based Architecture, SBA, networks.

DESCRIPTION

The network architecture of the Fifth Generation, 5G, telecommunication networks is defined in the new Third Generation Partnership Project, 3GPP, Release 15. An aspect in which the 3GPP networks will differ starting from Release 15 is that the Core Network, CN, architecture is mostly built around the Service Based Architecture, SBA, paradigm. That is, there will be a network domain, basically the core network, CN, in which the different functional components are defined as Services, which are self-contained functionalities that can be changed and modified in an isolated manner without affecting the others.

The architecture proposed for 3GPP Release 15 comprises logical Network Functions, NFs, within the CN, wherein most of them are built of one or more Services to form an SBA domain. The study phase for the Release 16 network is ongoing, according to which the 5G Core, 5GC, network will preserve the NFs as the main network constructs. However, it introduces a new concept of Set of instances, which is a Set of NF service instances of the same service type that can access the same data storage.

The inventors have found that the NF defined in the SBA architecture in Rel-15 represents certain limitations in how the vendors could implement them. The internal communication and data layer of the services within the NF may be proprietary but they must provide the standardized Service Based Interfaces, SBIs, when communicating with other NF services. This precludes the deployment of larger constructs, i.e. constructs including more functionality than what is included in a certain NF, where the internal 'services', i.e. the internal functional implementation within such larger constructs may be proprietary and interfaces when communicating within the construct could also be proprietary.

For example, it is found that it could be beneficial to design a larger network logic including both the Access & Mobility management Function AMF and Session Management Function, SMF, NFs. This would enable that the communication between internal 'AMF' and 'SMF' 'services' is proprietary and also these internal services may implement specific functionality optimizing AMF and SMF interaction, respectively.

Besides, as an NF is a large collection of functionality, it was found that it could be as well beneficial to define a construct that is a subset of the included functionality/ services. The technical challenge that such constructs represent is to ensure that internal services can use the proprietary communication and functionality when communicating with each other, while retaining a subset of standard functionality and SBIs when communicating with the external services. Besides, in the case when there is overlapping functionality of a SC and external SBA services, there should be a means to control which internal or external services or even service operations are selected for a specific case.

SUMMARY

It is an object of the present disclosure to overcome the drawback as mentioned above.

In a first aspect, there is provided a method of registering a service in a telecommunication network having a Service Based Architecture, SBA, wherein said telecommunication network having a Service Collection Function, SCF, comprising a plurality of distinct SBA services and comprising a Collection Controller, CoC, for registering and discovering of said plurality of distinct SBA services within said SCF, wherein said telecommunication network further comprises a Network Repository Function, NRF, for registering and discovering services within said telecommunication network.

The method comprises the steps of:
- receiving, by said CoC, from an of said distinct SBA services, a registration message for registering a service;
- determining, by said CoC, that said service is to be provided within said SCF;
- refraining, by said CoC, from forwarding said registration message to said NRF based on said determination;
- registering, by said CoC, said service in said CoC for discovering said service by any of said plurality of distinct SBA services within said SCF.

The present application is directed to the concept that a Collection Controller is introduced that acts on behalf of the internal consumers. The Collection Controller, CoC, may be arranged to control the internal and the external communication. The CoC may thus receive and respond to registration messages and discovery message from internal services within a service collection, and may send registration and discovery messages towards the SBA domain of the telecommunication network.

One of the advantages of using a CoC is related to the interfaces that are to be used. If multiple services are combined into a service collection, it may no longer be necessary to implement the interfaces between these services as defined in any standard. The interface between these multiple services may be made proprietary as a single vendor may deploy the service collection. There is no need to assure that other parties are able to interface with the services, the services are only access by components made by the same vendor.

One of the advantages of the proposed method is thus that it enables deploying constructs, i.e. service collections, in an SBA domain where the services within a SC may implement proprietary functionality and interfaces when communicating within the SC.

In the context of the present disclosure, a service collection may be viewed, but not limited to, as a packaging of SBA services with proprietary internal structure and providing a subset of external standard Application Programming Interfaces, API's. A service collection may have the following characteristics.

The services within a collection may implement proprietary functionality and interfaces when communicating within the collection.

Services that are offered externally by the service collection may be compliant to the respective standard. A service collection may not expose the services offered by the services it includes. Some services/operations that may be offered externally may be accessed internally, i.e. within the service collection, by other means.

It is noted that the functionality/external SBI's on a service collection may overlap with the functionality of other NF's in the SBA domain.

In other words, there is suggested to include a CoC in the telecommunication network which is to operate next to an NRF. Typically, services are registered in an NRF and any consumer may discover the registered services using discovery messages towards the NRF. The present application defines a CoC which acts as a function in between the service collection and the NRF. The CoC may thus receive a registration message for registering a particular service within the service collection. The CoC may determine whether the particular service to be registered is to be provided within the service collection only, or whether the service may also be provided within the SBA domain of the telecommunication network. In this particular scenario, it is assumed that the particular service is to be provided within the service collection only. In that particular case, the CoC refrains from forwarding the registration message to the NRF, as there is no need to register that particular service in the NRF. Finally, the CoC registers the service in the CoC itself such that that particular service may be discovered within said Service Collection Function.

In an example, the step of determining comprises:
determining, by said CoC, that said service is to be provided within said SCF based on an address comprised by said registration message for reaching said service.

The address may, for example, comprise an internal address such that the CoC is aware that the service is to be provided within the SCF.

In a further example, said method further comprises the steps of:
receiving, by said CoC from an of said distinct SBA services, a registration message for registering a further service;
determining, by said CoC, that said further service is to be provided within said telecommunication network;
forwarding, by said CoC, said registration message to said NRF for registering and discovering said further service in said NRF.

The above described example is directed to the concept that the CoC receive a registration message from an of said distinct SBA services, wherein said registration message is directed to registering a service that may be provided within the telecommunication network. As such, the CoC may forward that particular registration message to the NRF for registering that service in the NRF.

In a further example, said step of determining comprises:
determining, by said CoC, that said further service is to be provided within said telecommunication network based on an address comprised by said registration message for reaching said further service.

The address of the registration message may be used for determining whether a particular service is to be used within the SCF only or whether the service is to be used within the telecommunication network as a whole.

It is noted that, even in the situation described above, the CoC may use proprietary signalling towards the service within the SCF, and may use standardized signalling towards any other NF in the telecommunication network. The CoC may thus be arranged to perform protocol conversion for converting between standardized signalling and proprietary signalling.

In a further example, the method further comprises the steps of:
receiving, by said CoC, a discovery message for discovering another service;
determining, by said CoC, that said another service is not registered at said CoC;
forwarding, by said CoC, said discovery message to said NRF based on said determination.

In another example, the method further comprises the steps of:
receiving, by said CoC, a discovery message for discovering a different service;
determining, by said CoC, that said different service is registered at said CoC with an address within said SCF;
transmitting, by said CoC, a discovery response message comprising said address within said SCF.

Following the example provided above, the CoC may perform a translation of protocols, i.e. translating/converting from a standardized protocol to a proprietary protocol, or vice versa.

In a second aspect of the present disclosure, there is provided a Collection Controller, CoC, arranged for supporting registration of a service in a telecommunication network having a Service Based Architecture, SBA, wherein said telecommunication network having a Service Collection Function, SCF, comprising a plurality of distinct SBA services, wherein said CoC is arranged for operating in said SCF for registering and discovering of said plurality of distinct SBA services within said SCF, wherein said telecommunication network further comprises a Network Repository Function, NRF, for registering and discovering services within said telecommunication network.

The CoC comprising:
receive equipment arranged for receiving, from an of said distinct SBA services, a registration message for registering a service;
process equipment arranged for determining that said service is to be provided within said SCF, and for refraining from forwarding said registration message to said NRF based on said determination;
register equipment arranged for registering said service in said CoC for discovering said service by any of said plurality of distinct SBA services within said SCF.

The advantages of the first aspect of the disclosure being a method for registering a service in a telecommunication network, are also inherently a part of the second aspect of the disclosure. Furthermore, it is pointed out that although the claims read as if all the modules/equipments according to this second aspect of the present disclosure are incorporated into a single node, a person skilled in the art understands that the same disclosure could be implemented by, for example, distributing each of the modules over several nodes. Alternately, the disclosure could also be purely implemented in the cloud, whereby none of the physical nodes possess any of these modules/equipments as such.

In an example, the process equipment is further arranged for determining that said service is to be provided within said SCF based on an address comprised by said registration message for reaching said service.

In a further example, the receive equipment is further arranged for receiving, from an of said distinct SBA services, a registration message for registering a further service;
  said process equipment is further arranged for determining that said further service is to be provided within said telecommunication network;
  said register equipment is arranged for forwarding said registration message to said NRF for registering and discovering said further service in said NRF.

In another example, the process equipment is further arranged for determining that said further service is to be provided within said telecommunication network based on an address comprised by said registration message for reaching said further service.

In an example:
  said receive equipment is further arranged for receiving a discovery message for discovering another service;
  said process equipment is further arranged for determining that said another service is not registered at said CoC;
  said register equipment is further arranged for forwarding said discovery message to said NRF based on said determination.

In yet another example:
  said receive equipment is further arranged for receiving a discovery message for discovering a different service;
  said process equipment is further arranged for determining that said different service is registered at said CoC with an address within said SCF;
  said register equipment is arranged for transmitting a discovery response message comprising said address within said SCF.

In a third aspect of the present disclosure, there is provided a Collection Controller, CoC, for supporting registration of a service in a telecommunication network having a Service Based Architecture, SBA, wherein said telecommunication network having a Service Collection Function, SCF, comprising a plurality of distinct SBA services, wherein said CoC is arranged for operating in said SCF for registering and discovering of said plurality of distinct SBA services within said SCF, wherein said telecommunication network further comprises a Network Repository Function, NRF, for registering and discovering services within said telecommunication network.

Said CoC comprising:
  receive module for receiving, from an of said distinct SBA services, a registration message for registering a service;
  process module for determining that said service is to be provided within said SCF, and for refraining from forwarding said registration message to said NRF based on said determination;
  register module for registering said service in said CoC for discovering said service by any of said plurality of distinct SBA services within said SCF.

In a fourth aspect, there is provided a computer program product comprising a computer readable medium having instructions stored thereon which, when executed by a node in a telecommunication network, cause said node to implement a method in accordance with any of the method examples as provided above.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
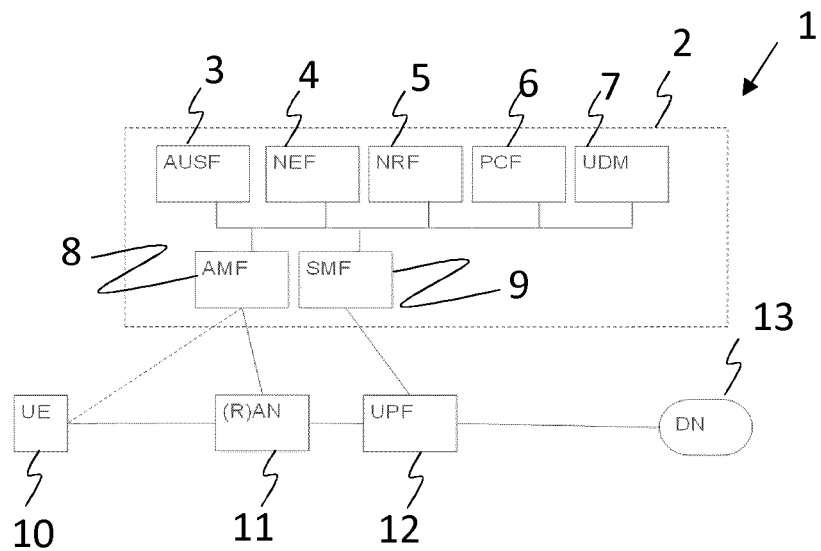
FIG. 1 discloses an example of a Fifth Generation, 5G, system architecture.

FIG. 1 schematically illustrates part of the reference architecture 1 of a fifth generation, 5G, Service Based Architecture, SBA, telecommunication network, according to the prior art. The 5G system architecture comprises the following Network Functions, NFs in the core network 2:
  Network Exposure Function, NEF, 4
  Network Repository Function, NRF, 5
  Policy Control Function, PCF, 6
  Authentication Server Function, AUSF, 3
  Unified Data Management, UDM, 7
  Access and Mobility Management Function, AMF, 8
  Session Management Function, SMF, 9

The 5G system architecture may further comprise a User Equipment, UE, 10, a Radio Access network, RAN, 11, a User Plane Function, UPF, 12 and a Data Network, DN, 13.

A functional description of these network functions is specified in clause 6 of the Third Generation Partnership Project, 3GPP, standard 23.501, "System Architecture for the 5G system", the contents of which are included herein, by reference.

Figure 2:
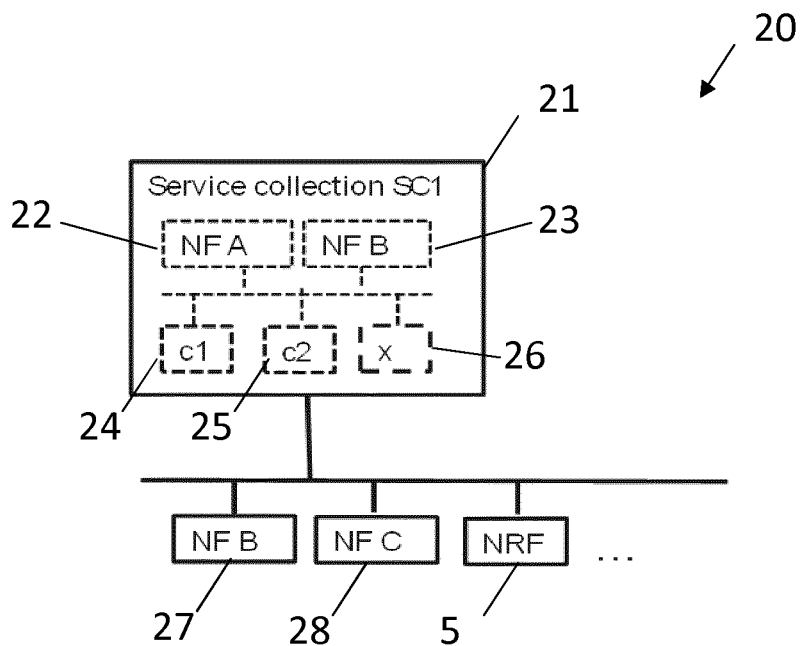
FIG. 2 discloses an example of a schematic representation of a Service Collection.

FIG. 2 discloses an example 20 of a schematic representation 21 of a Service Collection.

Here, it is noted that the functionality/external SBI's on a particular service collection 21 may overlap with the functionality of other Network Functions, NF's, in the SBA domain. For example, in this particular scenario, the service collection 21 implements the functionality of NF A 22, NF B 23, a subset of services of NF C, i.e. C1 24 and C2 25, as well as internal services x 26 which is not addressable by other SBA services.

Figure 3:
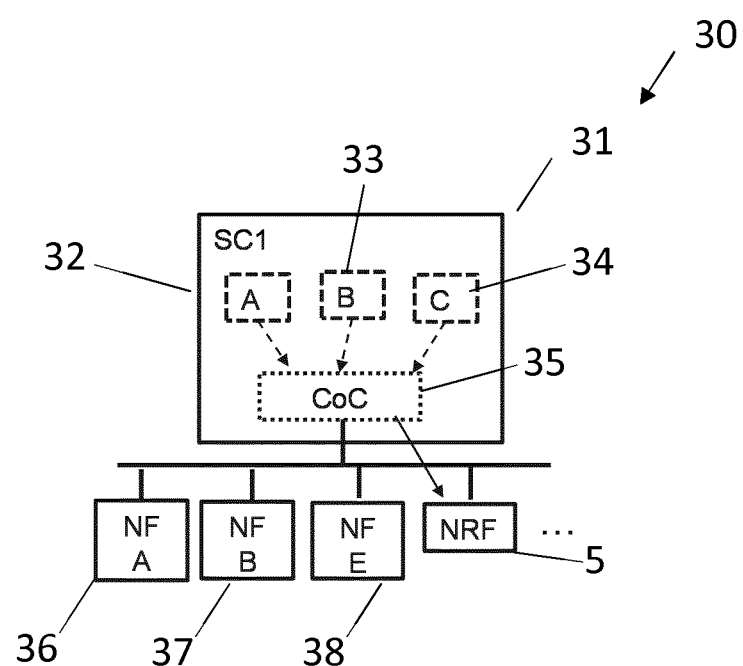
FIG. 3 discloses an example of a schematic representation of a Service Collection in combination with a Collection Controller in accordance with the present disclosure.

Further, in this example, it is considered that in the SBA domain NF B 27 and NF C 28 are also deployed with thus overlapping functionality, for example, from different vendors. The selection of a particular service, i.e. SC internal or external, for a certain operation may then depend on its features and characteristics. FIG. 3 discloses an example 30 of a schematic representation of a Service Collection 31 in combination with a Collection Controller, CoC, 35 in accordance with the present disclosure.

The CoC 35 may achieve transparent and smooth operation on a Service Collection 31 by participating into the registration and discovery signalling. In accordance with the present disclosure, the internal services, i.e. the services as indicated with reference numerals 32, 33 and 34 are to be registered in the CoC 35. The service collection may be provided by a single vendor such that the communication between the CoC 35 and each of the services 32, 33 and 34 may be standardized or proprietary.

In case the internal services, i.e. the services as indicated with reference numerals 32, 33 and 34, may also be reachable from the outside world, these internal services may also be registered in a Network Repository Function, NRF, 5. In that particular scenario, the CoC 35 may forward any registration message originating from any of the internal services 32, 33, 34 to the NRF 5 as indicated with a solid line.

An internal to the CoC 35 consumer may send discovery messages, either standardized or proprietary, to the CoC 35. If external SBA services are targeted, for example NF A 36, NF B 37 or NF E 38, then the CoC 35 may send standardized discovery messages to the NRF 5. Otherwise, the CoC 35 may respond internally to a discovery message for discovering a particular service.

Following the explanation above, the dashed lines provided in FIG. 3 may be proprietary while the solid lines may be standardized. The dashed lines in FIG. 3 may be implemented in a proprietary manner as the service collection may be provided by a single vendor.

Figure 4:
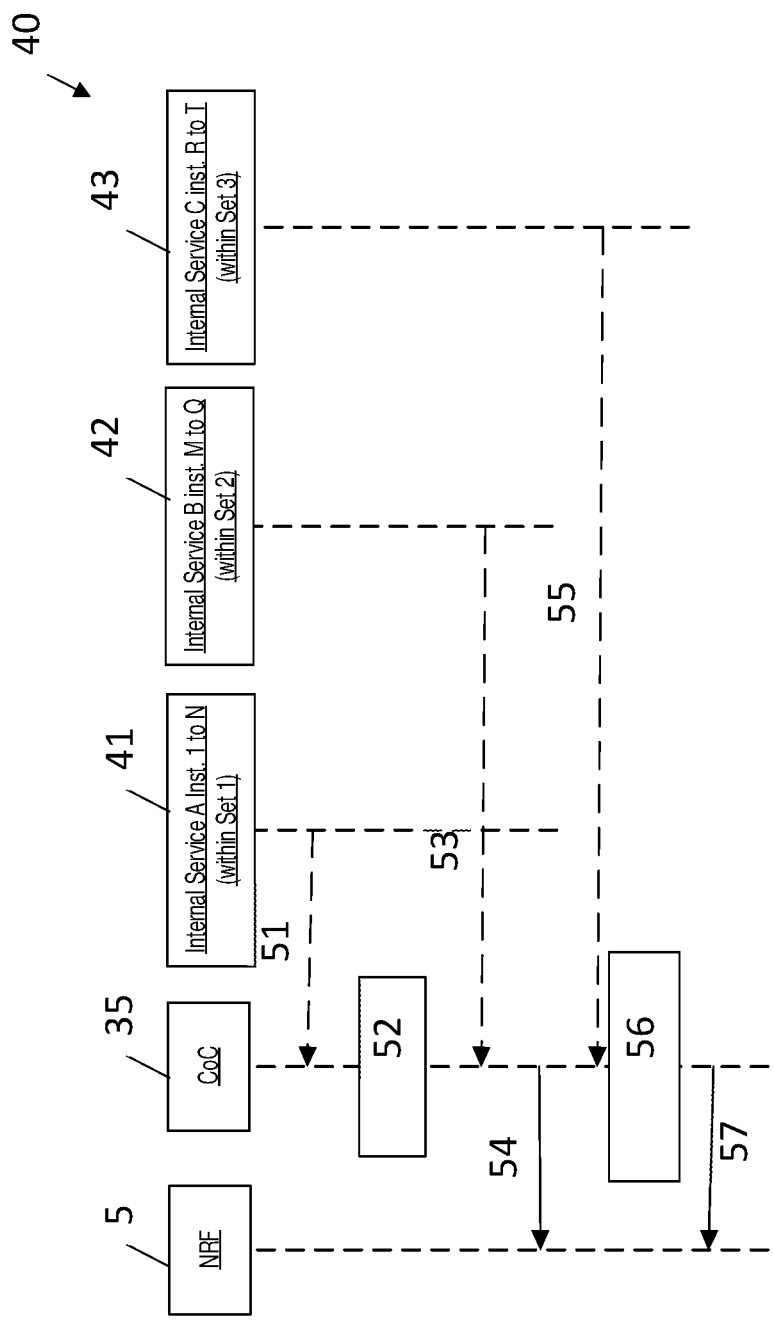
FIG. 4 discloses an example of a flow chart illustrating registration of services from within the service collection.

FIG. 4 discloses an example of a flow chart 40 illustrating registration of services from within the service collection.

In this particular example, the service collection comprises the internal service A 41, the internal service B 42 and the internal service C 43. In a first step, as indicate with reference numeral 51, the CoC 35 may receive, from an internal service A 41, a registration message for registering a service. The registration message is directed to register that particular service for internal use only, so for use within the service collection only.

The CoC 35 determines 52 that the service is to be provided within the service collection only. The CoC 35 may determine 52 that the service is to be provided within the service collection only based on the Uniform Resource Identifier, URI, in the registration message.

Then, the CoC 35 may refrain from forwarding the registration message to the NRF 5. Finally, the CoC 35 registers the service in the CoC 35 for discovering the service any of the plurality of internal services within the service collection.

Next, a further registration message is sent as indicated with reference numeral 53. Here, The Internal service instance B sends 53 a registration message to the CoC 35 specifying its reachability which is, for example, Set 2 SPoA URI for the SBA service B 42.

Since B 42 is an SBA service that may be reachable by external services, the CoC 35 may forward 54 the registration message to the NRF, by offering the Set 2 SPoA URI as its reachability information. It is noted that the CoC 5 may perform conversion techniques for converting the internal communication between the CoC 35 and the internal service B 42 to the external, standardized, communication between the CoC 35 and the NRF 5.

Another example is discussed with reference to internal service C 43. Here, the internal service C 32 sends 55 a service registration message to the CoC 35, wherein the service registration message comprises two different addresses. A first address is used for the internal service C and an external address is used as external service D. As such, the CoC 35 will register 56 the internal service having the internal service address in the CoC 35 for internal purposes, and will forward the registration message to the NRF 5 for the service having the external service address.

Figure 5:
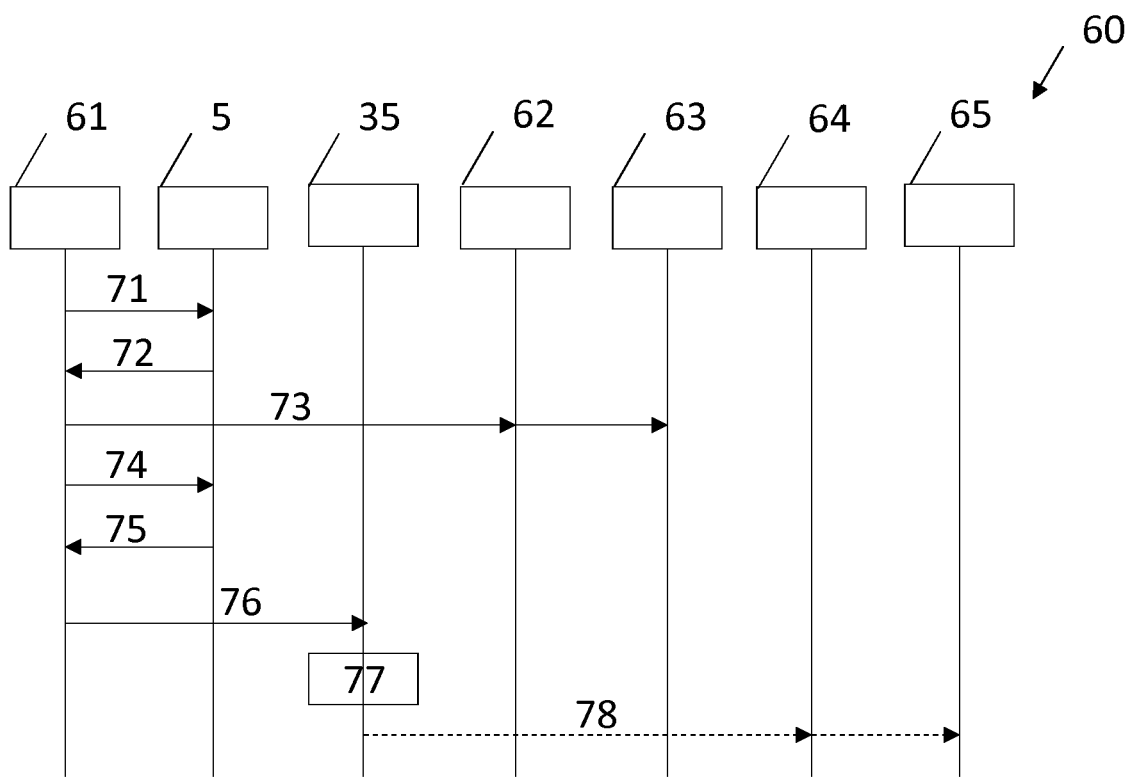
FIG. 5 discloses examples of service discovery in accordance with the present disclosure.

FIG. 5 discloses examples 60 of service discovery in accordance with the present disclosure.

Here, reference numeral 61 denotes an external consumer. Reference numeral 5 denotes the NRF. Reference numeral 35 denotes the CoC. Reference numeral 62 denotes a service Set 2 (SPoA). Reference numeral 63 denotes service B (within Set 2). Reference numeral 64 denotes Set 3 (SPoA). Reference numeral 65 discloses service C (within Set 3). It is noted that the services B and C of FIG. 5 correspond to the services B and C of FIG. 4.

In a step 71, the NRF 5 receives a service discovery message for discovering service B. As mentioned with respect to the explanation accompanying FIG. 4, the service B is to be reachable from the SBA domain and is, as such, registered in the NRF 5. As such, the NRF 5 is able to reply to the service discovery message by sending 72 a discovery response message comprising the address at which the service B is to be reached.

The external consumer 61 may then send 73 a Service B operation request to the Set 2 (SPoA), which is sent to the internal service B 63.

The above described example is thus directed to the concept that the service provided from within the service collection is also reachable from the SBA domain.

Another example is described here below. Here, a discovery message is sent 74 to the NRF 5 for discovering the service D. Here, the service D is reachable over a proprietary interfaces and is accessed 76 through the CoC that performs protocol conversion 77. The CoC 35 thus performs protocol conversion and communicates 78 to the corresponding service. A response message is received 75 from the NRF5.

Besides protocol conversion, the CoC 35 could be also configured of certain service operations to be allowed for a given service. That is, the CoC 35 could have a list of the accessible services/operations from the outside, e.g., by O&M configuration. This could differ from what is registered by the CoC 35 to the NRF 5. Thus, if an external service sent a service operation request that is not allowed then the CoC 35 could reply with a corresponding error message.

Figure 6:
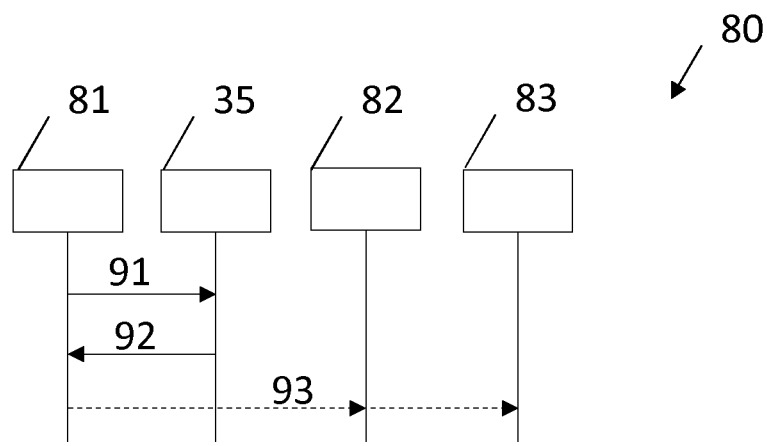
FIG. 6 discloses an example of the discovery of an internal service by an internal consumer in accordance with the present disclosure.

FIG. 6 discloses an example 80 of the discovery of internal services by an internal consumer in accordance with the present disclosure.

Here, reference numeral denotes an internal consumer. Reference numeral 35 denotes the CoC. Reference numerals 82 and 83 denote the Set 3 (SPoA) and the internal service C within Set 3, respectively.

First, a service discovery message is sent 91, from the internal consumer 81 to the CoC 35 for requesting the discovery of a service C. The CoC 35 determines that the service C is an internal service which is accessible for the internal user 81, and responds 92 to the internal user 81 with the Set 3 SPoA URI. Finally, the internal consumer 81 is able to use the retrieved Set 3 SPoA URI to sent 93 a Service C operation request towards the internal service C.

Figure 7:
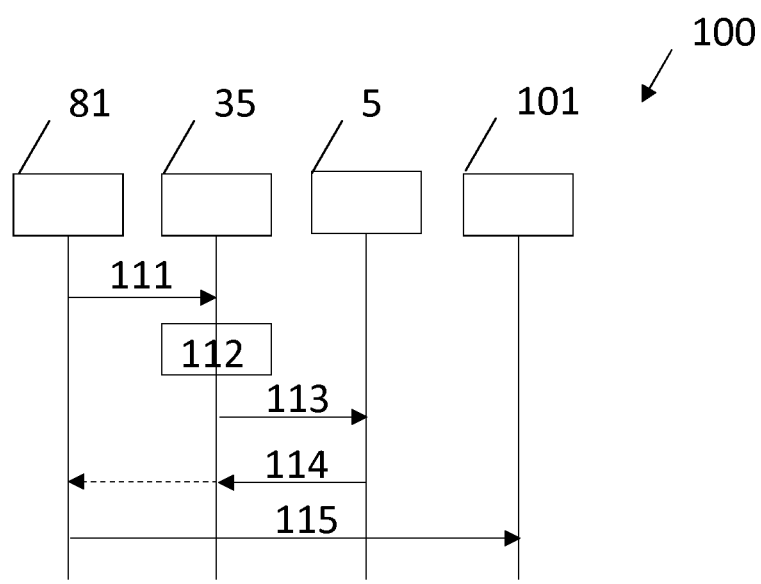
FIG. 7 discloses an example of the discovery of an external service by an internal consumer in accordance with the present disclosure.

FIG. 7 discloses an example 100 of the discovery of an external service by an internal consumer in accordance with the present disclosure.

Here, the CoC 35 may first receive 111 a service discovery message from an internal consumer 81. The CoC 35 may determine 112 that the requested service is not registered internally within the CoC 35. As such, the CoC 35 forwards 113 the discovery request message to the NRF 5, which provides for the response message 114 in accordance with the prior art. It is noted that the communication between the CoC 35 and the internal consumer may still be proprietary as is indicated with the dashed line. The internal consumer 81 is then able to reach 115 the requested service 101 using the response message.

Figure 8:
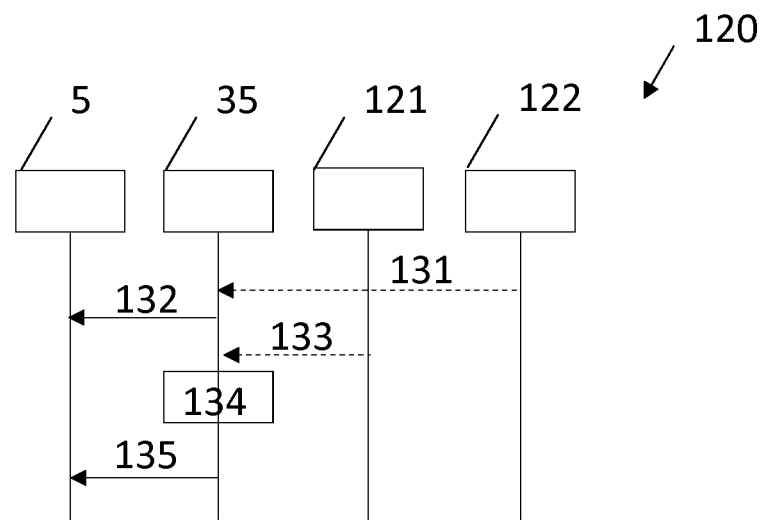
FIG. 8 discloses an example of multiple sets of the same SC internal service.

FIG. 8 discloses an example 120 of multiple sets of the same SC internal service.

Here, reference numeral 121 denotes internal service B instances 1 to N within Set 2 and reference numeral 122 denotes internal service B instances M to Q within Set 1.

This scenario indicates that there are two or more service sets of the same service. This may be required in order to increase the service availability, for example because there is no common shared database for the two sets, or to offer geo-redundancy, i.e. different sets distributed across different datacenters around the network.

When there is a single set of Service B, the CoC 35 could register the SPoA of Service B, i.e. reference numerals 131 and 132, that enables direct communication with the external consumers. However, when a new set is registered, i.e. reference numeral 133, then the CoC 35 may realize that there are multiple Sets to control, i.e. reference numeral 134, thus it may issue a registration update for Service B offering the CoC URI instead of the Set 1 SPoA, i.e. reference numeral 135. Reference numeral 5 indicates the NRF in this flow chart diagram.

Figure 9:
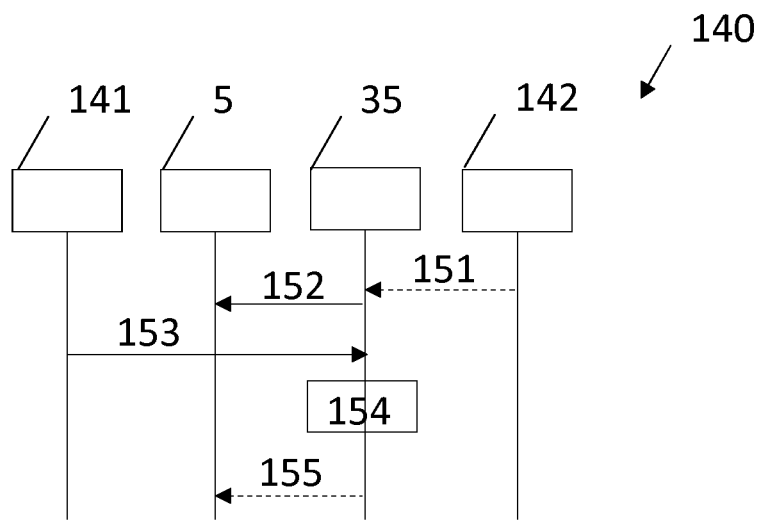
FIG. 9 discloses an example of multiple sets from both the SC and the external SBA domain.

FIG. 9 discloses an example 140 of multiple sets from both the SC and the external SBA domain.

Here, reference numeral 141 denotes an external service B instances 1 to N within Set 2, and reference numeral 142 denotes internal service B instances M to Q within Set 1.

This scenario assumes that two or more sets of the same service can be found both within an SC and outside the SC. In this case there may be a need to manage the different sets both from the bindings perspective, i.e. to find the set where a given UE/context is stored, but in addition there could be also an additional need to select an SC internal or external service, depending on a certain factor.

For example, one could like to control how much eMBB traffic a certain vendor equipment handles, e.g., Vendor A: 70% Vendor B 30% of traffic; or, alternatively, one Vendor equipment should take all the traffic as long as there are no special conditions like planned upgrades, failures etc.

FIG. 9 shows an example of handling such control, i.e. reference numerals 151, 152, 153, 154 and 155, when the new service control functionality is included in the CoC 35 or is separated, respectively. In the latter case, the Service Controller acts as front-end to the CoC and also to the other NFs or other CoC offering identical services. Note that in the case when there are multiple internal sets and at least one external to the SC, if there is a separate Service Controller then the communication involving an external consumer and an internal producer should pass both Service Controller and CoC, thus an integrated CoC_Service Controller solution for such cases is a more reasonable approach.

In the case when the services in the collection have definite operations offered for the other SC-internal services, and other operations for the external services, then the internal SBIs may be proprietary as they will only be used for other SC-internal services.

When the collection services offer the same service operation for both internal and external consumers, then it needs special consideration and functionality to use the proper interface by the proper operation. Alternatives:

Alternative 1: Implement both standard SBI and internal (proprietary) API for that operation in the respective collection service. When internal communication within Collection is very different from SBA principles, it could be an advantage to consider internal proprietary interface. As well, if the internal service structure differs significantly from the external one, having proprietary internal interface within the Collection may fit better. Of course, this means that one needs to implement both SBI and internal API for that operation, i.e., the implementation effort increases.

The CoC role in this case is to control access to either API or SBI from respectively internal/external services (mainly by registration/discovery). Protocol conversion is not required.

Alternative 2: Implement only standard SBIs that are used (with possible variants) also for internal communication. This decreases the implementation effort vs Alt 1. The disadvantage is the potentially less optimized implementation due to usage of external SBIs also for internal communication.

The CoC role in this case is to favor internal producer for internal consumers (mainly by registration/discovery). Protocol conversion is not required.

Alternative 3: Implement only proprietary SBIs, i.e., also for the external communication. The advantage is simpler internal services logic (only internal SBI is required). This however means that the CoC should have another role, i.e., to translate between internal/external SBIs. For this, all external communication should be mediated by CoC, which may increase communication latency. Also, conversion may not always be straightforward (also hard to extend CoC to handle SCs by other vendors that may have different internal communication interfaces, also for registration/discovery, which may be hard to control by a Controller from a given vendor.)

Along the present disclosure, we have described the invention considering Service instance and Service instance sets. In 3GPP there is now the tendency to retain the NF concept, that is, that services may be deployed as part of an NF, like it is done in Rel-15. This will imply the possibility that multiple NF instances could be deployed in pools/sets as well, in the same way as we have considered for service instance sets.

The two concepts are in fact very related, since an NF instance includes one or multiple service types, that are instantiated in normally pools of instances, (i.e. service instances sets). Even, the smallest NF instance Set may be just one single NF instance, since the NF instance may be considered on itself a container of a multiplicity of Service instances.

The teachings of the present disclosure is applicable for any entity sets, regardless of what functionality the entity contains. Thus, the invention applies both for NF instance sets and service instance sets, or even combinations of them, e.g., service instance sets within the SC and NF instance sets outside the SC.

The invention claimed is:

1. A method of registering a service in a telecommunication network having a Service Based Architecture (SBA), the telecommunication network having a Service Collection Function (SCF) comprising a plurality of distinct SBA services and comprising a Collection Controller (CoC) for registering and discovering the plurality of distinct SBA services within said SCF, the telecommunication network further comprising a Network Repository Function (NRF) for registering and discovering services within the telecommunication network, the method comprising:
- receiving, by the CoC, from one of the plurality of distinct SBA services, a registration message for the registering the service;
- determining, by the CoC, that the service is to be provided within said SCF only;
- refraining, by the CoC, from forwarding the registration message to the NRF based on the determination; and
- registering, by the CoC, the service in the CoC for discovering the service by any of the plurality of distinct SBA services within the SCF.

2. The method in accordance with claim 1, wherein the determining comprises:
- determining, by the CoC, that the service is to be provided within the SCF based on an address comprised by the registration message for reaching the service.

3. The method in accordance with claim 2, wherein the method further comprises:
- receiving, by the CoC from one of the plurality of distinct SBA services, a further registration message for registering a further service;
- determining, by the CoC, that the further service is to be provided within the telecommunication network; and
- forwarding, by the CoC, the further registration message to the NRF for registering and discovering the further service in the NRF.

4. The method in accordance with claim 3, wherein the determining comprises:
- determining, by the CoC, that the further service is to be provided within the telecommunication network based on an address comprised by the further registration message for reaching the further service.

5. The method in accordance with claim 2, wherein the method further comprises:
- receiving, by the CoC, a discovery message for discovering another service;
- determining, by the CoC, that the another service is not registered at the CoC;
- forwarding, by the CoC, said discovery message to the NRF based on the determination.

6. The method in accordance with claim 2, wherein the method further comprises, wherein the method further comprises:
- receiving, by the CoC, a discovery message for discovering a different service;
- determining, by the CoC, that the different service is registered at the CoC with an address within the SCF;
- transmitting, by the CoC, a discovery response message comprising the address within the SCF.

7. The method in accordance with claim 1, wherein the method further comprises:
- receiving, by the CoC from one of the plurality of distinct SBA services, a further registration message for registering a further service;
- determining, by the CoC, that the further service is to be provided within the telecommunication network; and
- forwarding, by the CoC, the further registration message to the NRF for registering and discovering the further service in the NRF.

8. The method in accordance with claim 7, wherein the determining comprises:
- determining, by the CoC, that the further service is to be provided within the telecommunication network based on an address comprised by the further registration message for reaching the further service.

9. The method in accordance with claim 1, wherein the method further comprises:
- receiving, by the CoC, a discovery message for discovering another service;
- determining, by the CoC, that the another service is not registered at the CoC;
- forwarding, by the CoC, said discovery message to the NRF based on the determination.

10. The method in accordance with claim 1, wherein the method further comprises:
- receiving, by the CoC, a discovery message for discovering a different service;
- determining, by the CoC, that the different service is registered at the CoC with an address within the SCF;
- transmitting, by the CoC, a discovery response message comprising the address within the SCF.

11. A Collection Controller (CoC) configured to support registration of a service in a telecommunication network having a Service Based Architecture (SBA), the telecommunication network having a Service Collection Function (SCF) comprising a plurality of distinct SBA services, the CoC being configured for operating in the SCF for registering and discovering of the plurality of distinct SBA services within the SCF, the telecommunication network further comprises a Network Repository Function (NRF) for registering and discovering services within the telecommunication network, the CoC comprising:
- receive equipment configured to receive, from one of the plurality of distinct SBA services, a registration message for the registering the service;
- process equipment configured to determine that the service is to be provided within the SCF only, and for refraining from forwarding the registration message to the NRF based on the determination; and
- register equipment configured to register the service in the CoC for discovering the service by any of the plurality of distinct SBA services within the SCF.

12. The CoC in accordance with claim 11, wherein the process equipment is further configured to determine that the service is to be provided within the SCF based on an address comprised by the registration message for reaching the service.

13. The CoC in accordance with claim 12, wherein:
- the receive equipment is further configured to receive, from one of the plurality of distinct SBA services, a further registration message for registering a further service;
- the process equipment is further configured to determine that the further service is to be provided within the telecommunication network; and
- the register equipment is configured to forward the further registration message to the NRF for registering and discovering the further service in the NRF.

14. The CoC in accordance with claim 13, wherein the process equipment is further configured to determine that the service is to be provided within the telecommunication network based on an address comprised by the further registration message for reaching the further service.

15. The CoC in accordance with claim 12, wherein:
- the receive equipment is further configured to receive a discovery message for discovering another service;
- the process equipment is further configured to determine that the another service is not registered at the CoC; and the register equipment is further configured to forward the discovery message to the NRF based on the determination.

16. The CoC in accordance with claim 11, wherein:
the receive equipment is further configured to receive, from one of the plurality of distinct SBA services, a further registration message for registering a further service;
the process equipment is further configured to determine that the further service is to be provided within the telecommunication network; and
the register equipment is configured to forward the further registration message to the NRF for registering and discovering the further service in the NRF.

17. The CoC in accordance with claim 16, wherein the process equipment is further configured to determine that the service is to be provided within the telecommunication network based on an address comprised by the further registration message for reaching the further service.

18. The CoC in accordance with claim 11, wherein:
the receive equipment is further configured to receive a discovery message for discovering another service;
the process equipment is further configured to determine that the another service is not registered at the CoC; and
the register equipment is further configured to forward the discovery message to the NRF based on the determination.

19. The CoC in accordance with claim 11, wherein:
the receive equipment is further configured to receive a discovery message for discovering a different service;
the process equipment is further configured to determine that the different service is registered at the CoC with an address within the SCF; and
the register equipment is configured to transmit a discovery response message comprising the address within the SCF.

20. A non-transitory computer readable storage medium having instructions stored thereon which, when executed by a node in a telecommunication network, cause registration of a service, the telecommunication network having a Service Based Architecture (SBA), the telecommunication network having a Service Collection Function (SCF) comprising a plurality of distinct SBA services and comprising a Collection Controller (CoC) for registering and discovering the plurality of distinct SBA services within the SCF, the telecommunication network further comprising a Network Repository Function (NRF) for registering and discovering services within the telecommunication network, the registration comprising:
receiving, from one of the plurality of distinct SBA services, a registration message for the registering the service;
determining that the service is to be provided within said SCF only;
refraining from forwarding the registration message to the NRF based on the determination; and
registering the service for discovering the service by any of the plurality of distinct SBA services within the SCF.

* * * * *